J. CHAPMAN.
AIR COOLED SPARKING PLUG.
APPLICATION FILED FEB. 3, 1919.
1,342,421.
Patented June 8, 1920.
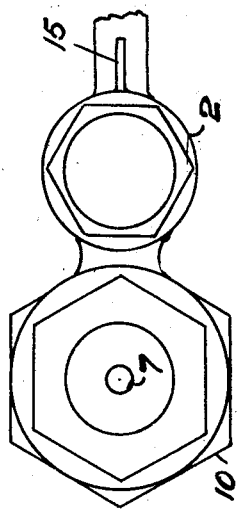
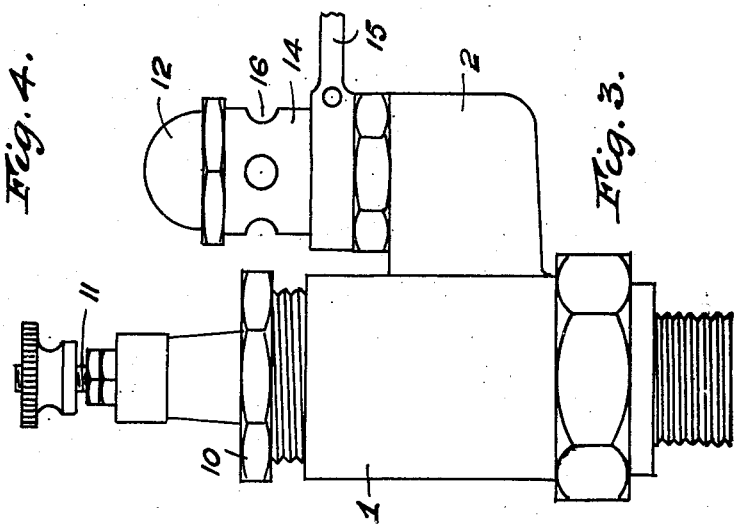
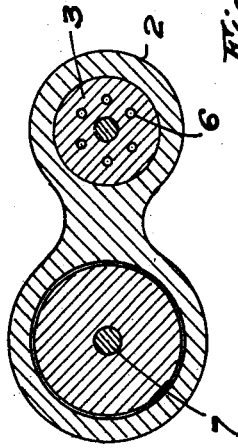
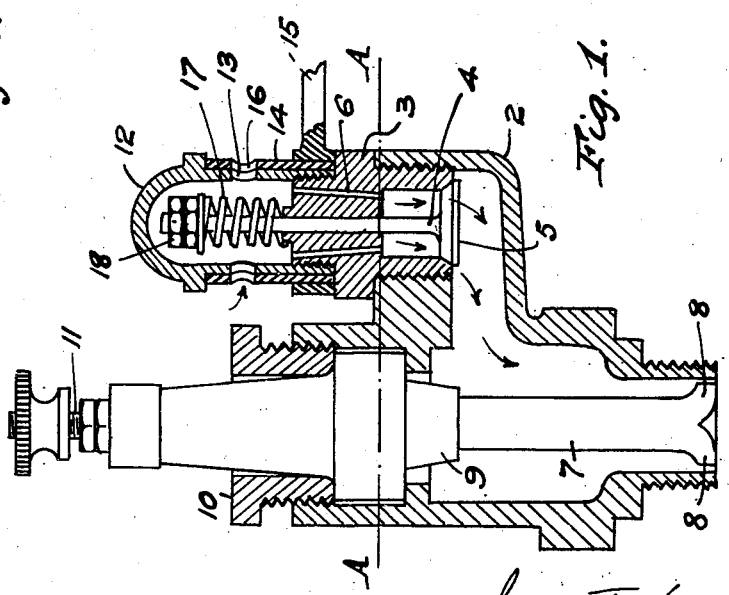
Inventor:
James Chapman

UNITED STATES PATENT OFFICE.

JAMES CHAPMAN, OF ROCK FERRY, BIRKENHEAD, ENGLAND.

AIR-COOLED SPARKING PLUG.

1,342,421.  Specification of Letters Patent.  Patented June 8, 1920.

Application filed February 3, 1919. Serial No. 274,641.

*To all whom it may concern:*

Be it known that I, JAMES CHAPMAN, a subject of the King of Great Britain, and a resident of Rock Ferry, Birkenhead, England, have invented certain new and useful Improvements in Air-Cooled Sparking Plugs, of which the following is a specification.

This invention relates to sparking plugs for internal combustion engines of that type in which the plug is provided with a branch having an air valve adapted to open under the suction action of the engine, means being provided for varying the openings or perforations in the branch through which the air is admitted, a perforated sleeve rotatably mounted on the branch masking to a greater or less extent corresponding perforations in the branch.

According to this invention, the air inlet valve in the plug is located in a separate branch on the side of the plug, into which branch is detachably fitted a valve seating, the valve being of the mushroom type and controlled by an adjustable spring, and means being provided for regulating the amount of air which may pass through the valve, such means preferably consisting of a series of perforations in the barrel of a hood or cap, which are adapted to be masked to a greater or less extent by a rotatable sleeve, perforated to correspond with a series of perforations in the hood barrel.

The invention is illustrated in the accompanying drawings, in which Figure 1. is a section through a sparking plug in accordance with this invention, Fig. 2. being a plan in section on the line A—A of Fig. 1, Fig. 3. being an outside elevation of the plug, and Fig. 4. a plan of Fig. 3.

In carrying out the invention, the body 1 of the sparking plug proper is provided with a branch 2 in which is detachably fitted a plug 3, which carries the valve stem 4 of a mushroom valve 5, the lower edge of the plug forming the valve seating. In the body of the plug is formed a series of perforations 6, by way of which air may pass from the atmosphere, under the suction action of the engine, and through the branch 2 when the valve 5 lifts, this air stream passing around the electrode 7 and cooling the sparking points 8, keeping them clear of carbon deposit and the electrode 7 cool even during high speeds of the engine. In order to augment this cooling action, the usual insulation 9 around the electrode 7 is stopped off a considerable distance from the sparking points 8, in order to provide a large surface open to the air current. The electrode 7 is secured in the body of the plug 1 by the usual gland 10, the connection of the cable being made at 11 in the usual way. Screwed on to the valve plug 3 is a hood 12, in the cylindrical wall of which is formed a series of perforations 13, and mounted rotatably around the barrel of the hood 12 is a sleeve 14, adapted to be rotated by a small lever 15. In the sleeve is formed a series of perforations 16 corresponding to the perforations 13 in the hood barrel, so that when the sleeve 14 is rotated to the open position a free passage of air through the valve is permitted, rotation of the sleeve to either side of this position masking the perforations more or less, or such perforations may be entirely masked and the air supply thus completely cut off. The valve 5 is held against its seating by a helical spring 17, the compression of which is adjusted by the lock nuts 18.

By forming the air inlet valve in a branch on the body 1 of the carbureter proper, the valve may be removed for inspection and adjustment without disturbing the electrical connections of the electrode 7, and the disadvantage arising from other types of air cooling plugs in which the electrode stem itself moves with the opening and closing of the air valve is avoided, such vibratory movement of the electrode 7 resulting in the connection of the electric cable at 11 being ultimately destroyed.

I claim:

An air cooled sparking plug, comprising a plug body having a hollow extension laterally for the passage of air, a detachable valve seat in said extension, including a plug, having an opening therein, for receiving a valve stem and perforations for the admission of air, a valve stem slidable in the plug, a valve carried thereby adapted to coact with the valve seat, a hood threaded on the plug, said hood having apertures therein, an aperture sleeve rotatable on the hood, a spring encircling the valve stem and bearing against the plug, and an abutment at the outer end of the valve stem for the said spring.

In testimony whereof I affix my signature in presence of two witnesses.

JAMES CHAPMAN.

Witnesses:
A. J. DAVIES,
E. HEGINBOTHAM.